3,398,579
CIRCUIT ARRANGEMENT FOR TEMPERATURE MEASUREMENT
Bohdan Carniol and Rudolf Stýblo, Prague, Czechoslovakia, assignors to Tesla, narodni podnik, Prague, Czechoslovakia
Filed June 17, 1965, Ser. No. 462,797
Claims priority, application Czechoslovakia, July 2, 1964, 3,837/64
3 Claims. (Cl. 73—342)

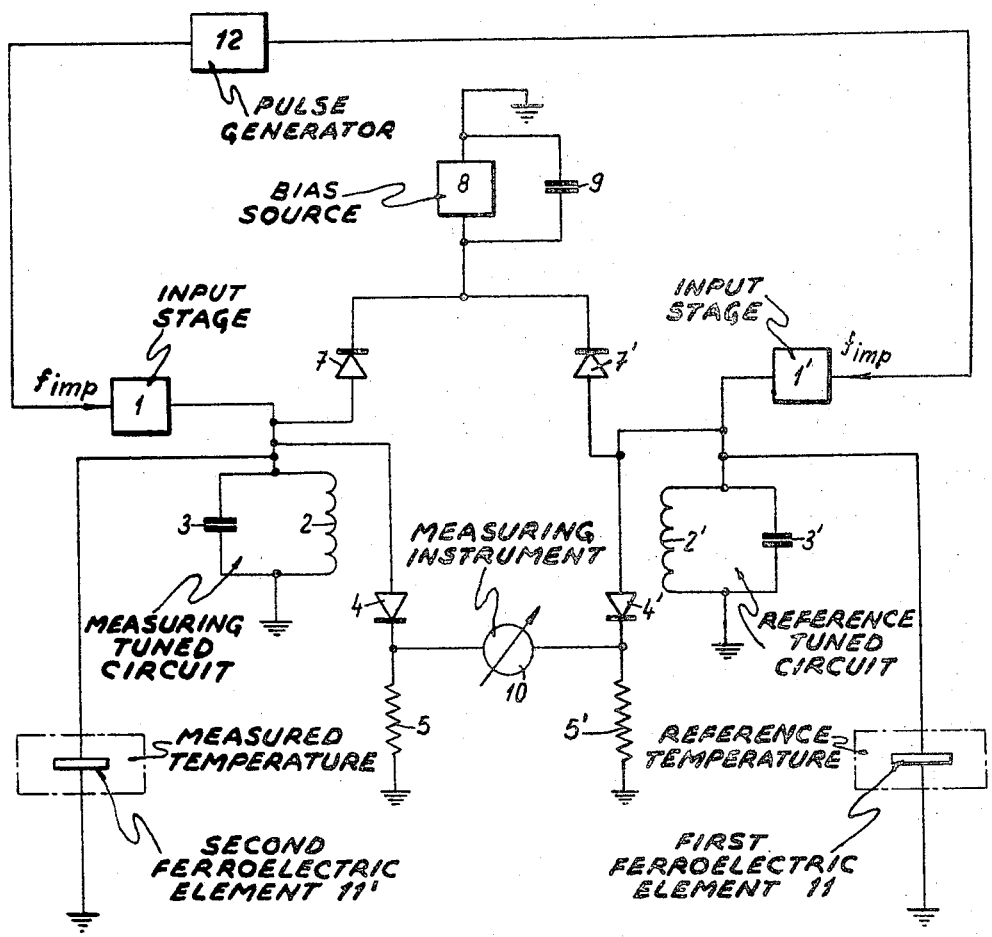

ABSTRACT OF THE DISCLOSURE

A temperature measuring circuit having two LC tuned circuits, one a reference tuned circuit and the other a measuring tuned circuit. A limitation diode connects each of the tuned circuits to a common DC bias source with respect to ground in order to maintain the peak values of shock-excited oscillations generated by the LC tuned circuits equal so that measurements of the difference between the oscillations of the tuned circuits, made by a measuring instrument connected to the tuned circuits, are characterized by great accuracy.

---

The invention relates to a device for measuring the damping of oscillations produced by tuned circuits with an extreme sensitivity as well as to the measurement of the parameters of a measured object which influences the damping. In accordance with the invention, two tuned circuits are energized by the same frequency and the mean value of a rectified free oscillation is measured, the free oscillation being energized in the measuring circuit at the pulse frequency. Limitation diodes with a common source of stabilized bias are connected to both, the measuring and the reference tuned circuits, respectively.

It is often required for various purposes to know the damping or the quality factor of a tuned LC-circuit or its equivalent, e.g. a cavity resonator, mechanical resonators and more often it is required to know the damping changes in dependence upon parameters of elements coupled to the measuring LC-circuit. Contactless measuring of electrical resistance, of the depth or of the distance between conductive measured objects, or a temperature measurement from the changes of ferroelectric losses etc. are illustrative of the important applications of the present invention.

The measurement parameters are obtained in such cases particularly from the damping changes of the measuring LC-circuit, in particular from the logarithmic decrement change of the free oscillation which is periodically energized in the measuring circuit.

Methods of permanent pulse energizing of two tuned circuits were examined in order to increase the sensitivity and the constancy thereof while continuously indicating the measured value. However, energizing the circuits by a single energizing stage is not advantageous in consequence of difficulties due to mutual coupling of both circuits and due to the difficulty of completing damping the free oscillation rests before reenergizing. Variation of the free oscillation amplitudes was ascertained while energizing both circuits from independent energizing stages, even at the limitation of the maximum amplitudes by the bias diodes. Increase of the sensitivity and the constancy of the equipment may be attained according to the invention in a similar way.

The object of the invention is to provide a circuit arrangement for damping measurement or its changes of a tuned measuring LC-circuit, and for measurement of the parameters of a coupled measuring object, influencing the damping. The mean value of a rectified free oscillation ($f_o$) is determined as a frequency being periodically energized in the measuring circuit by the pulse frequency ($f_{imp}$), by a measuring tuned circuit and a reference tuned circuit which are energized by the same pulse frequency ($f_{imp}$). Limitation diodes having a common stabilized source of bias are included in the circuit and detectors are connected to both circuits.

By using the single bias source for both limitation diodes, the measured value according to the invention is provided by comparing the signals derived from the mean value detectors connected to the measuring and reference LC-circuit or its equivalent. The most simple comparison is by measurement of the difference between both signals according to the circuit arrangement shown in the accompanying drawing, whose single figure depicts a specific illustrative embodiment of the principles of the present invention. In the drawing 1, 1' are terminal stages energizing periodically free oscillations in a measuring circuit 2, 3 and in a reference circuit 2', 3'. Both energizing stages are controlled by a common pulse generator 12 characterized by a frequency $f_{imp}$.

One of the mean value detectors compries a diode 4 and a resistor 5, and the other comprises a diode 4' and a resistor 5'. The difference signal proportional to the mean value of the free oscillation is applied from the detectors 4, 5 and 4', 5' to a measuring instrument 10. The limitation diodes 7 and 7' are connected to a common bias source 8. A parallel connected capacitor 9 may be connected to the bias source 8, if desired. The source 8 may comprise a stabilisation glow discharge lamp or a Zener diode.

An accurate measurement in accordance with the invention is achieved by means of limitation diodes having a common bias. The function of the diodes 7, 7' is as follows:

The measuring and reference circuits are excited by pulses so strong that the peak voltage of a free oscillation without the use of limitation diodes would exceed the value of the DC bias for the limitation diodes.

At an increase of the peak value of a free oscillation above the level of the DC bias, the limitation diodes 7, 7' actually open and lead the superfluous electric charge away. Consequently no considerable increase of the peak value above the level of the DC bias can occur. After discharge of a sufficient charge, the voltage on the measuring and reference circuits drops under the value of the DC bias. The limitation diodes thereby close and a free damped oscillation continues from this level as if there were no limitation diodes. As a result all the further amplitudes of a free oscillation are lower according to the exponential law and therefore do not open the limitation diodes. The entire cycle is repeated after a subsequent pulse excitement of a new sequence of a free oscillation. With respect to the fact that a common DC bias is used for both limitation diodes in accordance with the invention, the peak value on the both circuits i.e. the measuring and reference circuits, is identical with a great accuracy and even with a faint variation of the level of the DC bias. Owing to this identity an extreme accuracy is achieved.

The circuit arrangement may be also used for temperature measurement if a ferroelectric element is connected to each of the measured circuits, the element being heated by a free damped oscillation to a temperature close to the Curie temperature. A different outside surrounding influences each of the ferroelectric elements and changes its heat balance, the difference of both effects being used for the measurement. The ferroelectric elements may be heated by a free damped oscillation into the autostable state.

More specifically, it is known to substitute ferroelectric elements by an electric equivalent connection comprising a parallel combination of a capacitor C and a resistance R. The equivalent resistance of this arrangement changes with a temperature change. Accordingly, a change of damping of a tuned measuring circuit to which the ferroelectric element is connected exists in dependence of an ambient temperature i.e. of a temperature of a medium which surrounds the ferroelectric element and which is to be measured. A first ferroelectric element 11 is used in an area with the reference temperature of the surrounding medium and the appropriate reference circuit has its reference damping value. A second ferroelectric element 11' is connected to the measuring circuit and damps the measuring circuit to another value corresponding to a different temperature of the measured medium surrounding this ferroelectric element. The corresponding different DC voltages on the outputs of both detectors produce the measured value.

What we claim is:

1. A measuring circuit comprising:
   a reference tuned circuit including an inductor and a capacitor connected in parallel,
   a measuring tuned circuit including an inductor and a capacitor connected in parallel,
   means connected to said reference and measuring tuned circuits for energizing each of said tuned circuits at the same pulse frequency to drive said tuned circuits into an oscillatory mode of operation,
   reference detecting means connected to said reference tuned circuit and measuring detecting means connected to said measuring tuned circuit for detecting the magnitude of oscillations produced by said tuned circuits,
   measuring means connected to said reference and measuring detecting means for comparing the outputs of said detecting means and for indicating the difference between said outputs, and
   a peak limiting network connected to said reference and measuring tuned circuits, said network comprising two like-poled limitation diodes, means connecting like electrodes of said diodes to a corresponding terminal of each of said reference and measuring tuned circuits, means connecting the other electrodes of said diodes to a junction point, and a common DC bias source connected between said junction point and the other terminal of each of said reference and measuring tuned circuits.

2. A measuring circuit as claimed in claim 1, further comprising a first ferroelectric element connected to said reference tuned circuit and a second ferroelectric element connected to said measuring tuned circuit for influencing the damping of the oscillations produced by said measuring tuned circuit in accordance with a determined parameter to be measured.

3. A measuring circuit as claimed in claim 2, wherein said first element is positioned in a reference temperature and said second element is positioned in a temperature to be measured.

References Cited

UNITED STATES PATENTS

| 2,648,823 | 8/1953 | Kock et al. | |
| 2,721,267 | 10/1955 | Collins | 331—66 |
| 3,311,842 | 3/1967 | Beck | 73—362 X |

FOREIGN PATENTS

| 1,302,780 | 7/1962 | France. |
| 995,623 | 6/1965 | Great Britain. |

S. CLEMENT SWISHER, *Acting Primary Examiner.*

FREDERICK SHOON, *Assistant Examiner.*